United States Patent
Levin et al.

(10) Patent No.: US 8,893,128 B2
(45) Date of Patent: *Nov. 18, 2014

(54) REAL-TIME DISTRIBUTED MONITORING OF LOCAL AND GLOBAL PROCESSOR RESOURCE ALLOCATIONS AND DEALLOCATIONS

(75) Inventors: Oleg Levin, Acton, MA (US); Sonjeev Jahagirdar, Cambridge, MA (US); Moshe Emanuel Matsa, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,394

(22) Filed: Mar. 9, 2012

(65) Prior Publication Data

US 2012/0167113 A1    Jun. 28, 2012

Related U.S. Application Data

(63) Continuation of application No. 12/969,692, filed on Dec. 16, 2010, now Pat. No. 8,776,061.

(51) Int. Cl.
| | |
|---|---|
| G06F 15/16 | (2006.01) |
| G06F 11/00 | (2006.01) |
| G06F 11/30 | (2006.01) |
| G06F 9/50 | (2006.01) |

(52) U.S. Cl.
CPC .............. *G06F 9/5016* (2013.01); *Y02B 60/142* (2013.01)
USPC ........... 718/100; 718/104; 709/224; 370/229; 370/230

(58) Field of Classification Search
None
See application file for complete search history.

(56) References Cited

U.S. PATENT DOCUMENTS

| | | | | |
|---|---|---|---|---|
| 5,809,268 | A * | 9/1998 | Chan | 712/200 |
| 6,532,520 | B1 | 3/2003 | Dean et al. | |
| 6,601,083 | B1 * | 7/2003 | Reznak | 718/104 |
| 6,668,310 | B2 | 12/2003 | McKenney | |
| 6,817,011 | B1 * | 11/2004 | Reynolds | 717/130 |
| 7,032,222 | B1 * | 4/2006 | Karp et al. | 718/104 |
| 7,739,473 | B1 | 6/2010 | Nordquist | |
| 7,783,647 | B2 | 8/2010 | Cormode et al. | |
| 8,087,029 | B1 * | 12/2011 | Lindholm et al. | 718/105 |
| 8,091,088 | B2 * | 1/2012 | Kishan et al. | 718/104 |
| 2002/0199069 | A1 | 12/2002 | Joseph | |

(Continued)

FOREIGN PATENT DOCUMENTS

EP    0817044 A2    7/1998

OTHER PUBLICATIONS

Paul West, et al., Core Monitors: Monitoring Performance in Multicore Processors, CF '09, May 18-19, 2009, Ischia, Italy.

(Continued)

*Primary Examiner* — Emerson Puente
*Assistant Examiner* — Benjamin Wu
(74) *Attorney, Agent, or Firm* — Grasso PLLC; Fred Grasso

(57) ABSTRACT

Processes, devices, and articles of manufacture having provisions to monitor and track multi-core Central Processor Unit resource allocation and deallocation in real-time are provided. The allocation and deallocation may be tracked by two counters with the first counter incrementing up or down depending upon the allocation or deallocation at hand, and with the second counter being updated when the first counter value meets or exceeds a threshold value.

11 Claims, 4 Drawing Sheets

(56) References Cited

U.S. PATENT DOCUMENTS

| | | | |
|---|---|---|---|
| 2005/0114605 A1* | 5/2005 | Iyer | 711/133 |
| 2006/0136761 A1* | 6/2006 | Frasier et al. | 713/320 |
| 2006/0221819 A1* | 10/2006 | Padwekar | 370/229 |
| 2007/0086389 A1 | 4/2007 | Park et al. | |
| 2007/0286071 A1* | 12/2007 | Cormode et al. | 370/229 |
| 2008/0022283 A1* | 1/2008 | Krieger et al. | 718/104 |
| 2008/0077909 A1* | 3/2008 | Collins et al. | 717/104 |
| 2008/0244576 A1* | 10/2008 | Kwon et al. | 718/1 |
| 2009/0049449 A1* | 2/2009 | Varadarajan | 718/104 |
| 2009/0178041 A1 | 7/2009 | Friess et al. | |
| 2009/0300134 A1* | 12/2009 | Smith et al. | 709/216 |
| 2010/0049985 A1 | 2/2010 | Levow et al. | |
| 2010/0064043 A1* | 3/2010 | Iino et al. | 709/226 |
| 2010/0235496 A1 | 9/2010 | Zhao | |
| 2010/0271940 A1 | 10/2010 | Padwekar | |
| 2010/0312872 A1 | 12/2010 | Cormode et al. | |
| 2012/0030356 A1* | 2/2012 | Fletcher | 709/226 |
| 2012/0066383 A1 | 3/2012 | Cormode et al. | |
| 2012/0159502 A1* | 6/2012 | Levin et al. | 718/104 |

OTHER PUBLICATIONS

Xiao Zhang, et al., Towards Practical Page Coloring-based Multi-Core Cache Management, EuroSys '09, Apr. 1-3, 2009 Nuremburg, Germany.

Levent Akyil, Managing Applications' Thread Usage on Shared Memory Systems to Improve Aggregate System Performance, Intel, May 23, 2009.

Jiang Lin, et al., Enabling Software Management for Multicore Caches with a Lightweight Hardware Support, SC '09, Nov. 14-20, 2009, Portland, Oregon.

David Tam, Managing Shared L2 Caches on Multicore Systems in Software, Workshop on the Interaction between Operating Systems and Computer Architecture, 2007.

Matthew A. Watkins, et al., Dynamically Managed Multithreaded Reconfigurable Architectures for Chip Multiprocessors, PACT '10, Sep. 11-15, 2010, Vienna, Austria.

Jichuan Chang, Cooperative Caching for Chip Multiprocessors, University of Wisconsin-Madison, 2007.

Bryan Ford, et al., Evolving Mach 3.0 to a Migrating Thread Model, 1994.

Fenggueng Song, et al., Modeling of L2 Cache Behavior for Thread-Parallel Scientific Programs on Chip Multi-Processors, University of Tennessee Sep. 2006.

Michael Hanus, Putting Declarative Programming into the Web: Translating Curry to Javascript, PPDP'07, ACM, 2 Penn Plaza, Suite 701-NY, NY, Jul. 14-16, 2007.

International Search Report and Written Opinion, PCT Application PCT/EP2010/067968, May 30, 2012.

* cited by examiner

REAL-TIME DISTRIBUTED MONITORING OF LOCAL AND GLOBAL PROCESSOR RESOURCE ALLOCATIONS AND DEALLOCATIONS

BACKGROUND

The present invention relates to shared resources, and more specifically to selectively updating, in real-time, resource status counters in a multi-core environment.

DESCRIPTION OF RELATED ART

Central Processing Units (CPUs) can include one or more processing cores and may be coupled to or supported by various resources. These support resources may communicate with the core or cores to provide instructions, data, networking, I/O, storage, and buffering services. As core clock speeds have increased, the need to increase the speed and robustness of these support resources has increased as well.

The oft-repeated analogy, that a chain is as strong as it its weakest link, can apply with regard to overall system processing speed. When computations are not conducted during each clock cycle for one or more cores of the CPU, overall performance can suffer. These lost computation clock cycles can be reduced by increasing the availability of instructions and data to the processing cores of the CPU. For example, buffers, which can stockpile instructions and data ahead of processing, can be used and can serve to reduce lost CPU clock cycles. Also, local cache, which can be faster and closer than main memory, may be used to store regularly repeated instructions and data, and anticipated instructions and data. Other features, such as improved bus speeds and more robust I/O methodologies, can also serve to increase overall system computation speed.

Cache memory, one of the supporting resources, can include multiple blocks of high-speed memory for use by the CPU. Rather than always reading from and writing to slower main memory, cache memory may be employed to minimize latency periods attributable to main memory read/write operations. Thus, cache memory serves as closer and quicker temporary storage for instructions and data.

Cache memory can vary in size, speed, and position relative to the CPU. The cache closest to the CPU is often designated as L1 cache and can be bifurcated into separate cache for data and instructions. This L1 cache may reside on the core complex of a CPU. The next cache further from the core is often designated as L2 cache. L2 cache may be twice the size or more of L1 cache and may be shared by more than one CPU core. The third and final cache—L3 cache—may be larger than the L2 cache and may serve multiple cores and multiple CPUs.

The size of each level of cache may serve to determine the extent to which main memory is accessed during processing and how much data is written to main storage afterwards. Cache misses, instances when data or instructions needed for a process are not found in cache, can serve to slow down the overall performance of a CPU and a system.

BRIEF SUMMARY

Embodiments include processes, devices, and articles of manufacture having provisions to monitor and track resource allocation and deallocation. The allocation and deallocation may be tracked by two counters, where the first counter increments up or down depending upon the allocation or deallocation at hand, and where the second counter may be updated when the first counter value meets or exceeds a threshold value. The incrementing of the second counter in this fashion may serve to reduce frequency by which the second counter is updated and the frequency by which a resource associated with that second counter is used as well. The value or status of the second counter, which can be reflective of an available quality of service, may be used when determining if a new allocation request attributable to a resource is granted or provisioned for.

In embodiments, a computing device comprising a bus; processor, and resources may be provided. The processor may be configured to track requests to allocate or deallocate the first processor resource; increment a first resource counter up or down with an increment reflecting the size of the allocation or deallocation of the first resource; determine, after incrementing the first resource counter up or down, whether the absolute value of the first resource counter meets or exceeds a first resource counter threshold; and when the absolute value of the first resource counter is determined to meet or exceed the first resource counter threshold, update a second counter with an increment reflecting the value of the first resource counter size. The processor may be further configured to reset the first resource counter and; before finalizing a request to allocate a processor resource, consider the value of the second counter, and determine if a quality of service criteria can be satisfied if the requested allocation of the processor resource is finalized.

In embodiments, when the difference between the first resource counter threshold and the global threshold exceeds a predetermined percentage, the processor may update the first resource counter threshold with a revised first resource counter threshold for use in subsequent monitoring.

In embodiments, the processor may be a multi-core processor and the first resource may be cache or other memory. In embodiments, the requests to allocate or deallocate resources may be linked to the initiation or conclusion of process threads running on the multi-core processor and the requests to allocate or deallocate the processor resources may be made for each thread allocation or deallocation.

DETAILED DESCRIPTION

Embodiments of the invention relate to shared resources and the selective update of status counters of these resources in a multi-core environment. In embodiments, local and global resource counters may be used to evaluate the availability, workload, or status of a resource. As the resource is allocated or deallocated, a local counter aligned with that resource may be incremented or decremented in value consistent with the actual allocation or deallocation. The change in value of the local counter may be used to update a global counter if a threshold has been met or crossed. If the threshold has not been met or crossed, additional allocations and deallocations may be tracked by the counter with concomitant increases or decreases in the value of the counter. Once again, the current counter status may be compared to a threshold value. If the threshold value is met or crossed, the local counter may be reset to zero, and the applicable global counter may be increased or decreased by the counter value.

The global counter value may be used to inform or track resource availability, status, or quality of service. In other words, if a resource is under pressure, as reflected by the global counter, threads, processes, data transfer, or other operations may be held or rerouted to available resources. Likewise, when a resource is available or underutilized, the global counter may inform that status as well. For example, when main memory is tracked as a resource, counters may be used to reduce the number of read/write operations from/to main memory, thereby increasing the use of local cache memory and advantageously providing for improved speed and operations associated with cache memory use.

Embodiments may be carried out in environments with tracking and counter configurations designated in the operating system, at the application level, in specific plug-ins or modules, and in other ways as well. These embodiments may be configured such that a desired number of transactions can be executed in parallel. They may also be configured such that a target number of parallel transactions may be executed together in the multi-core embodiment.

Figure 1:
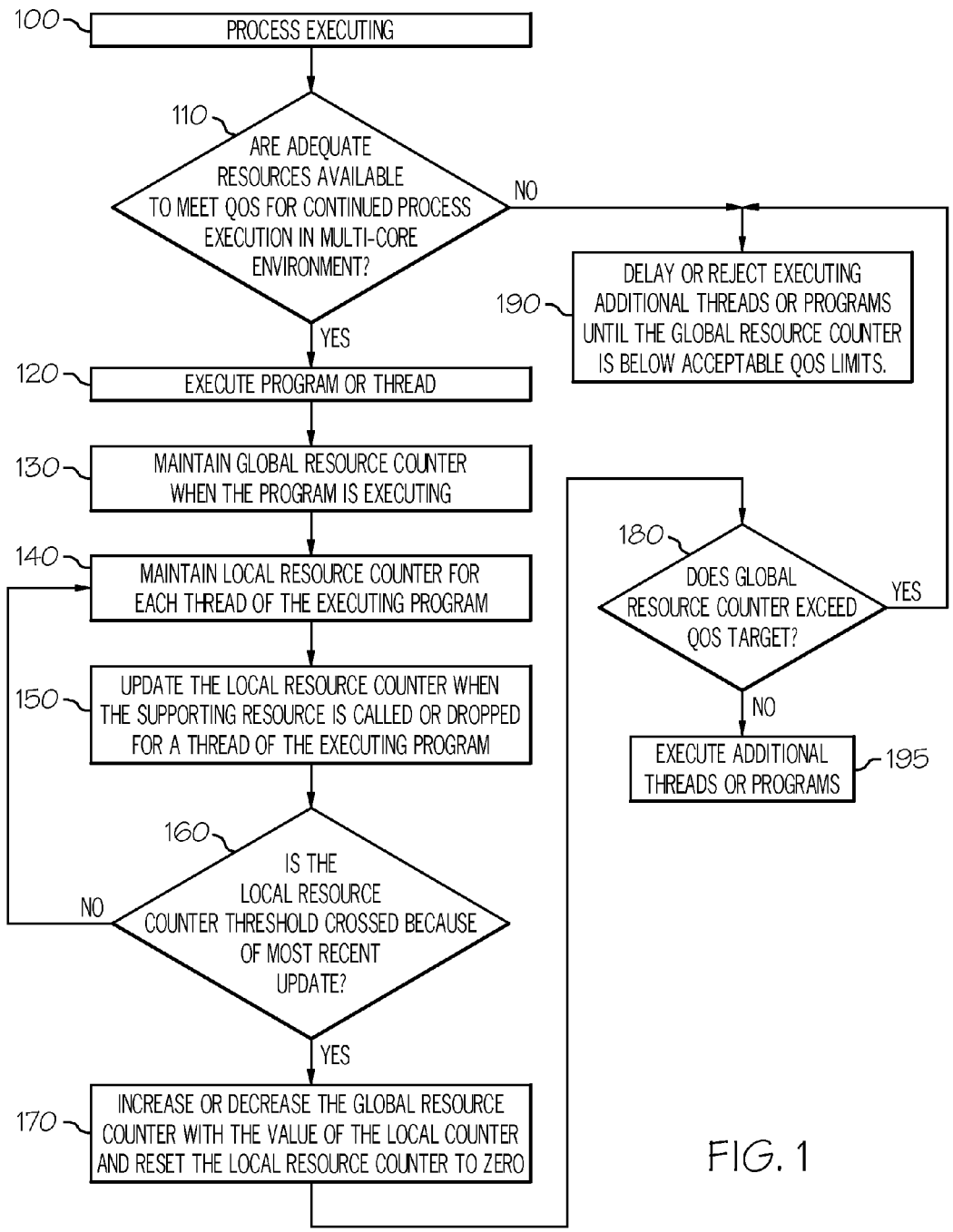
FIG. 1 shows a process with features and elements consistent with embodiments of the invention.

FIG. 1 shows a flowchart of features and elements as may be employed in embodiments of the invention. As with each of the embodiments described herein, the features and elements may be used in processes, configured into articles of manufacture, and used to adapt or configure computing devices. As shown in FIG. 1, embodiments can serve to manage main memory, reduce the number or frequency of cache misses, improve overall system processing speed, improve system efficiency or improve quality of service.

As can be seen in FIG. 1 at 100, features and elements of embodiments may include various queries and steps carried out during process execution. As shown at 110, a query, test, action, or other provision may be carried out to determine if adequate resources are available to meet quality of standards for new processing or execution or continued processing or execution of a program. This query, test, action, or other provision may include checking the status of a resource, querying a resource directly or indirectly, and determining whether the status of the resource indicates that a thread, data, or other portion of an executing program, may be accepted or processed with the assistance of the resource.

As shown at 190, if adequate resources are not available, the thread, program code, or data, may be delayed or rejected from execution or handling until adequate resources to maintain quality of service are available. This may include whether a global resource counter indicates that adequate main memory is available to execute or continue running threads, portions of processes, or other code. This may also include determining whether data strings represent information too large for manipulation, storage, or buffering by existing resources. These resources may include cache memory, buffers, I/O adapters, and serial interfaces, among others. Once the delay or rejection has occurred or has lapsed for appropriate reasons, the process execution may continue, as shown at 100.

At 110, if adequate resources are determined to be available to satisfy QOS parameters or guidelines for continued processing, the particular program or thread may be executed or the particular data may be transferred or stored, as shown at 120. Furthermore, a global resource counter, which may be tracking multiple local resource counters for a single resource type of a multi-core processor or across several multi-core processors, may be increased by a predetermined amount in order to reflect that the particular resource being tracked by the global resource counter is being occupied. Likewise, if a resource is being released or is not being used as much, the global resource counter may be decreased in value to reflect the concomitant change in the local counter value or the resource allocation.

As shown at 140, a local resource counter, particularly associated with or assigned to a local resource and a particular thread or program code being executed, may also be increased to reflect that the particular resource is currently being used by the thread or program element. At subsequent points in time, when the resource is no longer being used, the local resource counter may be decreased.

At 150, the local resource counter may be updated when the supporting resource associated with the local resource counter is allocated or deallocated. In other words, if the memory allocation is made to account for a process thread, the local resource counter may be increased by the amount of the memory allocation. Likewise, the local resource counter may be decreased by an amount consistent with the amount of deallocated memory. Furthermore, when a thread execution is completed, and the thread no longer needs to maintain the memory allocation, the local resource counter may be decreased by an amount consistent with the amount of memory previously allocated with the thread or presently deallocated with the thread.

In embodiments, at certain instances in time, if the local resource counter reaches a threshold, the local resource counter may be reset to zero and the global resource counter may be increased or decreased incrementally. The meeting of a threshold or crossing a threshold is shown at step 160, and the increase or decrease of the global resource counter is shown at step 170. Crossing the threshold may be completed during both allocations and deallocations of the memory or other resource. Consequently, in embodiments the absolute value of the local resource counter may be considered to determine whether a threshold is crossed and the value may be added to or subtracted from the global counter to account for an increase or decrease in resource availability or use. In other words, in embodiments, such that the global resource counter may be maintained, even though an absolute value of the local resource counter is considered when determining whether a threshold is crossed, the global resource counter may be adjusted both upwardly and downwardly by an amount consistent with the size of the resource allocation or deallocation.

For example, when an amount of used memory is being managed, if a threshold is 100 MB, and this threshold is crossed because 10 MB is allocated for a thread (and the existing counter reflects 90 MB or so of allocation), an additional 100 MB may be added to the global resource counter as the local resource counter is reset to zero. Likewise the deallocation of 10 MB of memory may be considered to cross the threshold and trigger an adjustment in the global resource counter. However, in this instance, the global resource counter may be reduced since the threshold crossing was triggered by a deallocation of memory.

At 180, if the global resource counter does not exceed the quality of service target additional threads or programs or processes may be executed as shown at 195. Conversely, if the quality of service target is exceeded, then, as shown at 190, additional threads or programs may be delayed or rejected until the global resource counter is below an acceptable QOS limit. This QOS limit may be set by an administrator, may be predetermined, may float according to required client needs, or may be set by other methodologies as well.

Figure 2:
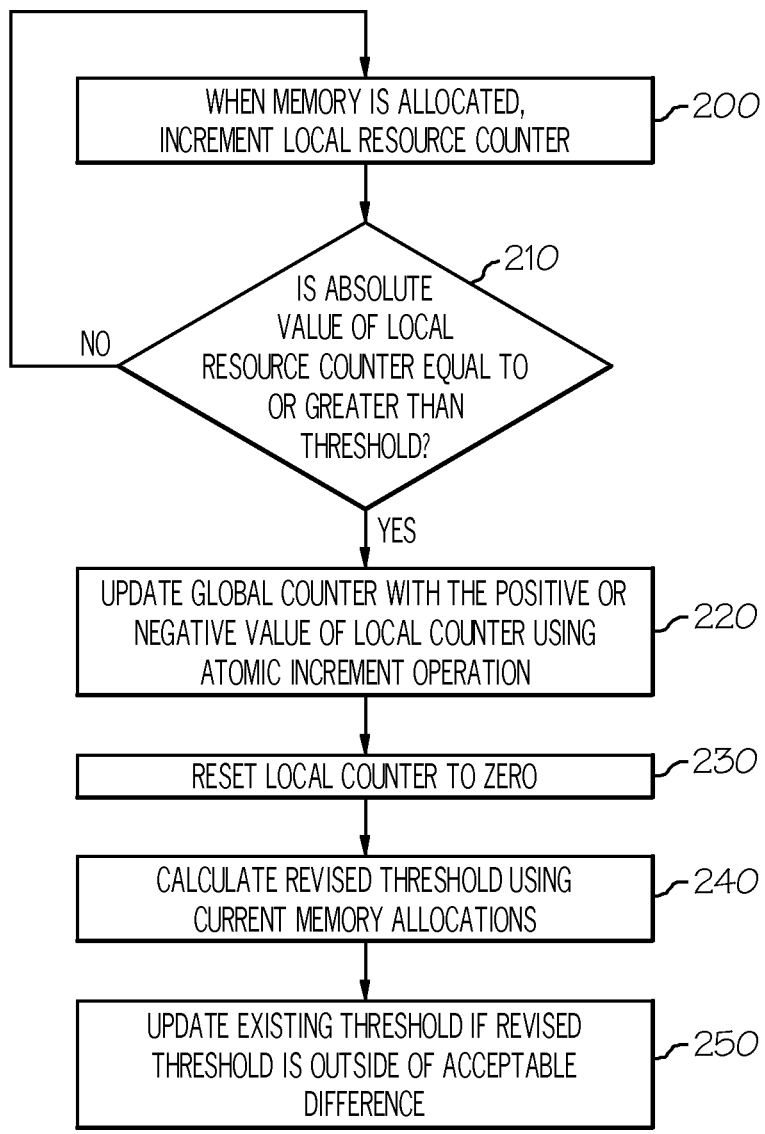
FIG. 2 shows a process with features and elements consistent with embodiments of the invention.

FIG. 2 shows features and steps of embodiments of the invention. FIG. 2 addresses the incrementing and resetting of the local counter and the incrementing and decrementing of a global counter. FIG. 2 also addresses adjusting the threshold by which the local resource counter may be measured.

As shown in FIG. 2 a process is loaded and executing in a multi-core environment. At 200, when memories allocated for a specific thread or program elements of local resource counter are to be incremented, a local resource counter may be assigned or attributed to the specific thread as well as to resource type. This newly incremented local resource counter value may be measured against a threshold to determine if the recent change exceeds the threshold. This comparison is shown at 210. There, a query is conducted as to whether an absolute value of the local resource counter is greater than or equal to the threshold. As shown in FIG. 2, if the threshold for the local resource counter has not been met or crossed the status counter may remain unchanged, the memory will be allocated for the thread, and process execution may continue. Conversely, if the absolute value of local resource counter is equal to or greater than the threshold, then, as shown at 220, the global counter may be updated using an atomic increment operation. This atomic increment operation may be done with a value that serves to increase the global counter as well as decrease the global counter. As shown at 230, upon meeting or crossing the threshold, the local counter may be reset to zero. As noted above, because the threshold may be compared to absolute values of the allocation or deallocation, the adjustment of the global resource counter may be in either a positive or negative direction even though the local resource may be reset to zero.

As shown at 240, in embodiments, once a threshold has been met a revised threshold may be recalculated using current memory allocations or other current resource conditions. Recalculating the threshold after reset or after a percentage change or other predetermined criteria, may serve to increase the accuracy or exactness of memory allocations or other managed resource allocations. Changing the threshold may also serve to reduce the number of changes to the global resource counter. Accordingly, as shown at 250, if a new threshold calculated or determined is beyond an acceptable difference, the threshold may be updated to reflect the newly calculated or determined number. Comparably, if the newly calculated threshold for 240 is within acceptable tolerance, the previously existing threshold for the local resource counter may remain. This type of threshold calculation and adjustment can serve to move the threshold to a value that is more suitable to the processor environment.

Figure 3:
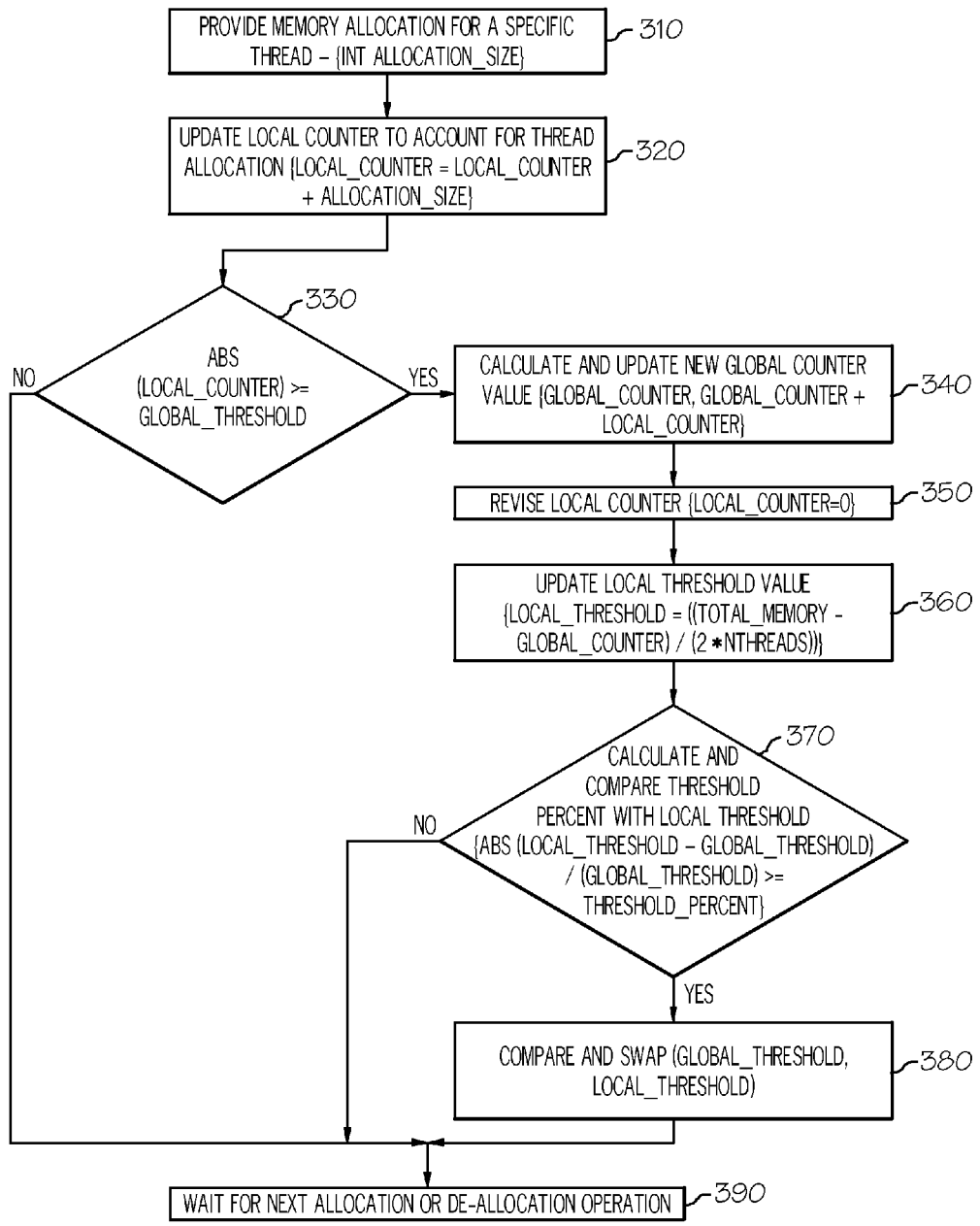
FIG. 3 shows a process with features and elements consistent with embodiments of the invention.

FIG. 3 shows features and steps of an embodiment as may be employed for memory allocation in a multi-threaded multi-core environment. The embodiment shown in FIG. 3 may be employed in various ways, methods, and architectures. As shown at 310, memory allocation for specific threads in a multi-core environment may be provided by an integer variable allocation_size. As shown at 320, the multi-core environment may be configured to update local counters to accommodate thread allocations through a configuration that includes a variable local_counter being set equal to the local_counter plus the integer variable allocation_size. As shown at 330, the multi-core environment may be configured such that if the absolute value of the local_counter variable is greater than or equal to the value of the local_threshold variable, then atomic increment of the global_counter value can apply and processing continues at 340. If the absolute value of the local_counter variable is not greater than or equal to the local_threshold variable, then the multi-core environment may be configured such that it may wait for the next allocation or deallocation operation as shown at 390.

As shown at 340, the multi-core environment may be configured such that the atomic increment of the existing global counter value may be carried out using a variable global_counter and a variable local_counter. These atomic increment operations will update global counter with the local_counter variable being added to or subtracted from global counter variable. In other words, the atomic increment operation may serve to increase or decrease the existing global counter by a value attributable to the existing local_counter value of a thread memory counter.

As shown at 350, when a threshold for a local thread counter is met or crossed the local thread counter may be reset to zero. This is reflected at 350 with the variable local_counter being set equal to zero. As shown at 360, the multi-core environment may be further configured to adjust or update the threshold value for the local counters after the threshold value has been satisfied. Adjusting or updating the threshold value may not occur each time a threshold is crossed and may depend on a percentage difference or other difference between the size of the threshold, the value of the global counter, and the number of threads being executed in the multi-core environment. Tag 360 shows that an update of the local_threshold value may occur when the free memory (total_memory less the value of the global_counter) is greater than the inverse of the number of threads currently running in a multi-core environment. The number of threads running may be tabulated or accumulated based upon the number of threads running on a single core in the multi-core environment, as well as groups of cores in the multi-core environment. In embodiments, the cores that are not yet evaluated with regard to step 360 may be those cores that are served by the same L1 cache or L2 cache. Other criteria may be used as well.

Tag 370 reflects that the multi-core environment may be further configured to calculate and compare a threshold percent with regard to a local_threshold. This calculate and compare configuration may include finding the difference between the local_threshold and the global_threshold, dividing the difference by the global_threshold and in determining if that percent difference is greater than or equal to a previously established threshold_percent. This calculate and compare may be conducted such that small changes in threshold values may be discounted for subsequent determinations but larger changes in threshold values may provide for adjustment in the local threshold_value for subsequent determinations.

As shown at 380 the multi-core environment may be configured such that when the calculated compare shown at 370 does exceed or equal a threshold percent, a substitution operation may be conducted. The multi-core environment may be configured such that the substitution operation may occur if the global_threshold subtracted from the total_memory is greater than or equal to the inverse of the number of threads running on the specific core allocated to that resource.

The multi-core environment may also be configured such that if the calculated compare operation of 370 is not satisfied, then the system environment may continue to wait for the next allocation or deallocation operation. This waiting or standby is shown at 390.

Figure 4:
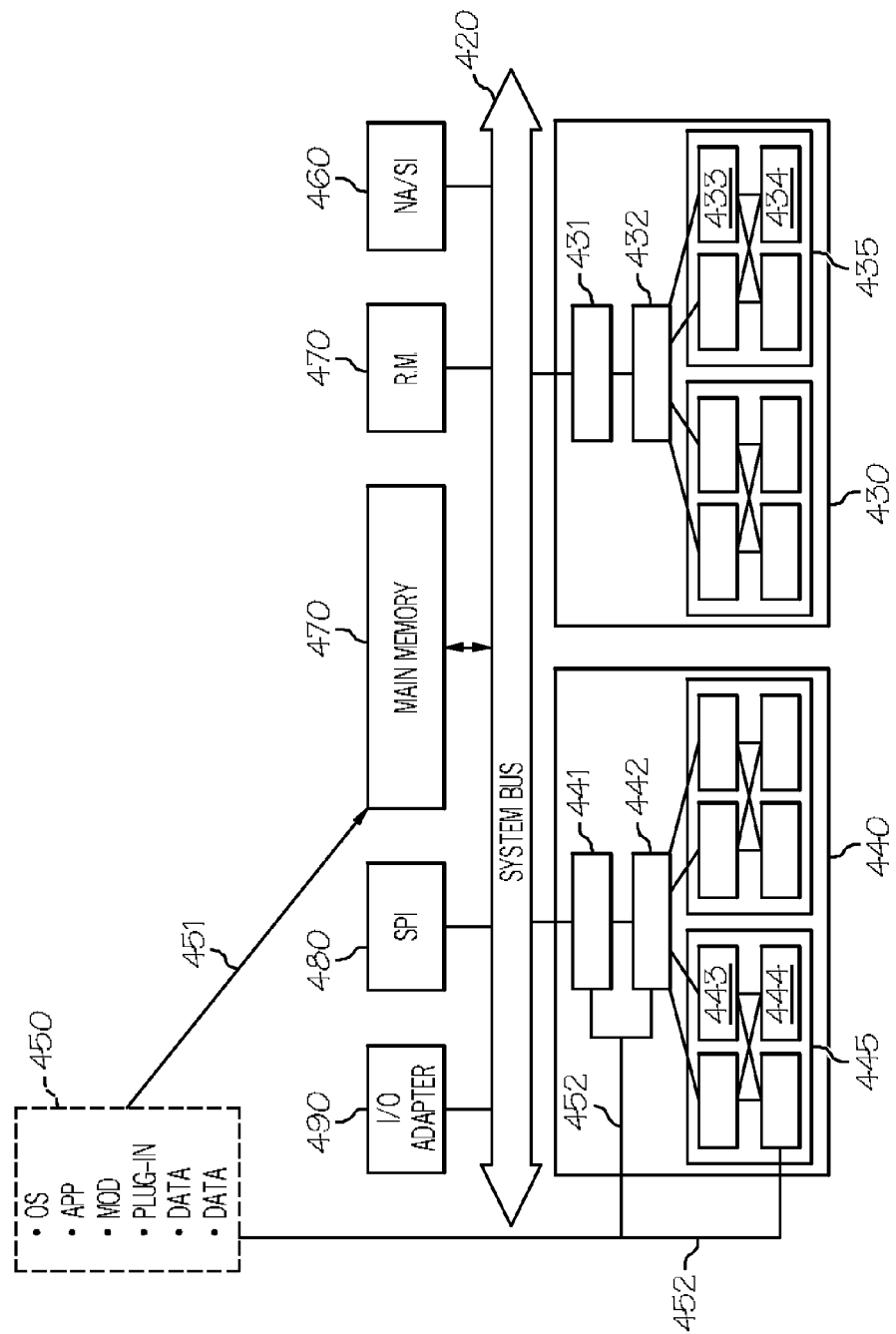
FIG. 4 shows a device with features and elements consistent with embodiments of the invention.

FIG. 4 shows a device as may be employed in accord with embodiments. As can be seen the device may include a bus 420 that may be connected to an input/output adapter 490, a serial port interface 480, removable memory 470, a network adapter serial interface 460, and processors 440 and 430. The processors 430 and 440 may each include cache and individual cores; 441 and 431 show L3 cache in this device.

As can be seen the L3 cache is hanging off the bus 420. As can also be seen the L2 cache is connected between the L1 cache and the L3 cache. The L2 cache, 442 and 432, each service multiple cores 445 and 435. The L1 cache is shown at 443 and 433. This L1 cache may include data cache and instruction cache and may serve to provide memory for processing conducted by processors 444 and 434.

Programs, instructions and operating systems, as shown at 450, may be loaded into main memory 470 as well as the processors, cores, and cache. The multi-core environment shown in FIG. 4 may, thus, be configured by specific operating systems, applications, modules, plug-ins, and various data consistent with the embodiments and teachings provided herein.

In embodiments, the local resource counters may be configured to track thread allocations resident in the cache shown in FIG. 4. Thus, as allocations for threads resident in the cache increase or decrease, additional threads being run by the processors 440 and 430 may or may not be started. Whether or not the threads may begin to be executed or may call data or otherwise use memory, may depend on the value of a local counter as well as the global counter that may be used to track main memory or another resource.

In embodiments, the blocks of memory within the cache may be addressed and indexed to facilitate searching and accurate storage and retrieval. The blocks of memory within the cache may also be synchronized with main memory during or after processing operations. Cache memory may be positioned between the CPU and main memory such that all communications to main memory from the CPU must pass through the cache. The cache may also be positioned apart from the main memory but still coupled to the CPU.

In embodiments, two levels of memory status counters may be employed and each thread may have its own local counter which may be updated when memory allocation/deallocation is undertaken on the applicable thread. The global counters may be externally accessible and, as explained elsewhere, may be incremented/decremented with the value of local counter when the value of the local counter reaches or exceeds a threshold.

In embodiments, the threshold can be set to a specific value or calculated based on the global counter and the total amount of memory. For example, as explained in FIG. 3, the following formula can be used ((Total memory−Used memory)/2)/the number of threads. When devices are configured in this fashion, the reduction or increase in the threshold may move exponentially based on the amount of free memory. For example, the precision associated with the value of the global counter may be determined by the value of the threshold. Should the threshold be imprudently set to 0, the global counter will be updated on each memory allocation/deallocation.

In embodiments, the local counters may intercept all calls that make memory allocation/deallocation operation. For Linux/Unix systems wrapper functions for standard C-library malloc, free and realloc routines may employed to make these intercepts. Still further, in embodiments, the local counters may be implemented as either thread-local variables or as an element of a data structure, for example:

```
#define MAX_THREADS_NUM 32 // maximum number of threads
/* !!! Up to MAX_THREADS_NUM worker threads, each 64 byte
to fill a cache line */
      int local_counters [MAX_THREADS_NUM];
```

In embodiments, the global counter may be defined as volatile, and its value may not be stored in the register, so that changes to it being visible across all the threads.
    volatile int global_counter;
In embodiments, the total amount of memory available for applications may be set once, but the available memory may change if other processes running on the same system influence it to make it smaller. In circumstances where available memory may not be frequently changed and may be safely used with a slightly old value, the total memory variable may be declared as non-volatile.
    int total_memory;
In embodiments, a variety of algorithms may be used to calculate the value based on the amount of total memory, the value of global counter, and the number of threads. As shown in FIG. 3, the formula may recite ((total_memory−global_counter)/2)/(the number of threads). In this embodiment, it is presumed that the number of running threads is not changing, if the latter isn't the case threshold may need to be recalculated when a new thread starts or an existing thread finishes.
    int threshold;
In embodiments, the threshold percent may be set once and subsequently determined towards a precision threshold value. In embodiments, if two threads simultaneously calculate a new threshold value, only one of them need update the variable. The threshold may be set locally to reduce the likelihood of concurrent updates.

In embodiments, as explained above, when memory allocations or deallocations occur, the following actions may be performed:

1. increment or decrement local counter depending on whether memory is allocated or released;
2. if absolute value of local counter greater or equal to threshold;
   2a. update global counter with the value of local counter using atomic increment operations;
   2b. reset local counter to 0;
   2c. calculate threshold using formula above; and
   2d. set threshold if calculated value in Step 2c differs from current threshold value more than threshold_percent. This is done to avoid unnecessary update and to reduce the number of L2 cache misses; and
3. Exit.

The terminology used herein is for the purpose of describing embodiments or portions of embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operation, elements, components, and/or groups thereof.

In embodiments, "COMPARE AND SWAP," atomic increment, or other concurrency primitives, can be implemented by numerous methods of concurrency, including use of the common main memory Compare and Swap (CAS), Load-Linked/Store-Conditional (LL/SC), or any other Read- Modify-Write instruction, set of instructions, or constructs based on such instructions, or their alternatives.

Embodiments may be implemented as a computer process, a computing system, a device, or as an article of manufacture such as a computer program product of computer readable media. The computer program product may be a non-transitory computer storage medium readable by a computer system and encoding computer program instructions for executing a computer process.

Aspects of the present invention may also be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, then install the proxy server code on the proxy computer. The process software will be transmitted to the proxy server, then stored on the proxy server.

What is claimed is:

1. A process comprising:
configuring a processor to monitor allocations and deallocations of a first processor resource and a second processor resource,
wherein monitoring the allocations and the deallocations of the first processor resource and the second processor resource comprises:
tracking requests to allocate or deallocate the first processor resource and the second processor resource;
for a requested allocation or deallocation of the first processor resource, incrementing a count of a first processor resource counter up or down with an increment reflecting an extent of the respective allocation or deallocation of the first processor resource, the first processor resource counter configured to indicate negative values when the extent of the requested deallocation is larger than the existing count of the first processor resource counter before the deallocation;
determining, after incrementing the count of the first processor resource counter up or down, whether the absolute value of the count of the first processor resource counter meets or exceeds a first processor resource counter threshold;
upon determining that the absolute value of the count of the first processor resource counter meets or exceeds the first processor resource counter threshold,
updating a count of a second counter up or down with an increment reflecting the value of the first processor resource counter count and resetting the count of the first processor resource counter;
before finalizing an additional request to allocate the first or the second processor resource, comparing the value of the second counter after updating the count of the second counter with an increment reflecting the value of the first processor resource counter count with a predefined limit to determine whether a predefined criteria can be satisfied if the additional requested allocation of the first or second processor resource is granted; and
upon determining that a difference between the first resource counter threshold and a second threshold exceeds a predetermined value, updating the first resource counter threshold with a revised first resource counter threshold for use in subsequent monitoring.

2. The process of claim 1 wherein the processor being configured is a multi-core processor and wherein the first processor resource is L2 cache and the second processor resource is main memory.

3. The process of claim 1 wherein the processor is a multi-core processor.

4. The process of claim 1 wherein the processor being configured is a multi-core processor and wherein requests to allocate or deallocate the first and the second processor resource are linked to the initiation or conclusion of process threads running on the multi-core processor.

5. The process of claim 1 wherein
the first processor resource is thread allocated memory,
the second processor resource is thread allocated memory,
requests to allocate or deallocate the first and the second processor resource are attributable to thread allocation or deallocation in the processor, and
the second counter is a global counter tracking every allocation or deallocation of the first resource and the second processor resource.

6. A process comprising:
configuring a processor to monitor allocations and deallocations of a first processor resource and a second processor resource,
wherein monitoring the allocations and the deallocations of the first processor resource and the second processor resource comprises:
tracking requests to allocate or deallocate the first processor resource and the second processor resource;
for a requested allocation or deallocation of the first processor resource, incrementing a count of a local counter up or down with an increment reflecting an extent of the respective allocation or deallocation of the first processor resource, the local counter configured to indicate negative values when the extent of the requested deallocation is larger than the existing count of the first processor resource counter before the deallocation;
determining, after incrementing the count of the local counter up or down, whether the absolute value of the count of the local counter meets or exceeds a local counter threshold;
upon determining that the absolute value of the count of the local counter meets or exceeds the local counter threshold, updating a count of a global counter up or down with an increment reflecting the value of the local counter count and resetting the value of the count of the local counter;
before finalizing an additional request to allocate the first or second processor resource, comparing the value of the global counter after updating the count of the global counter with the increment reflecting the value of the local counter count with a predefined limit to determine whether a predefined criteria can be satisfied if the additional requested allocation of the first or second processor resource is granted; and
upon determining that a difference between the local counter threshold and a second threshold exceeds a predetermined value, updating the local counter threshold with a revised local counter threshold for use in subsequent monitoring.

7. The process of claim 6 wherein the processor being configured is a multi-core processor and wherein the first processor resource is L2 cache and the second processor resource is main memory.

8. The process of claim 6 wherein the processor is a multicore processor.

9. The process of claim 6 wherein the processor being configured is a multi-core processor and wherein requests to allocate or deallocate the first and the second processor resource are linked to the initiation or conclusion of process threads running on the multi-core processor.

10. The process of claim 6 wherein
the first processor resource is thread allocated memory,
the second processor resource is thread allocated memory,
requests to allocate or deallocate the first and the second processor resource are attributable to thread allocation or deallocation in the processor, and
the second counter is a global counter tracking every allocation or deallocation of the first resource and the second processor resource.

11. A process for managing resources of a processor, the process comprising:
- configuring a processor to monitor allocations and deallocations of resources of the processor,
- wherein monitoring the allocations and the deallocations of the resources comprises:
  - providing a first incremental counter, the first incremental counter configured to increment up when resources are allocated to the processor and to increment down when resources are deallocated from the processor, wherein the increment up or down reflects an extent of the corresponding resource allocation or deallocation, and the first incremental counter is configured to indicate negative values when the extent of the resource deallocation is larger than the existing count of the first incremental counter before the deallocation;
  - providing a global counter, the global counter updated by a respective absolute value of a plurality of incremental counters including the first incremental counter when the absolute value of any incremental counter in the plurality of incremental counters is equal to or greater than a respective threshold;
  - resetting the value of the first incremental counter after an absolute value of the count of the first incremental counter is equal to or greater than a threshold for the first incremental counter and continuing to increment the first incremental counter up when resources are allocated to a processor and to increment the first increment counter down when resources are deallocated from the processor;
- setting a new value for the threshold for the first incremental counter using currently available processor memory allocations;
- further updating the threshold value for the first incremental counter or a global threshold for the global counter if the new threshold value of the first incremental counter is outside of an established tolerance; and
- receiving a request for an additional allocation of resources, and before finalizing the request, comparing the value of the global counter with a predefined limit to determine whether a predefined criteria can be satisfied if the request is granted.

* * * * *